United States Patent
Chen et al.

(10) Patent No.: US 7,408,896 B2
(45) Date of Patent: Aug. 5, 2008

(54) METHOD AND SYSTEM FOR PROVIDING MOBILE WIRELESS ACCESS POINTS

(75) Inventors: Liren Chen, San Diego, CA (US); Jack Steenstra, San Diego, CA (US); Kirk Steven Taylor, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 91 days.

(21) Appl. No.: 11/142,993

(22) Filed: Jun. 1, 2005

(65) Prior Publication Data

US 2006/0198361 A1    Sep. 7, 2006

Related U.S. Application Data

(60) Provisional application No. 60/658,268, filed on Mar. 2, 2005.

(51) Int. Cl.
 *H04Q 7/00*    (2006.01)
(52) U.S. Cl. ............... 370/328; 370/238; 370/338; 455/456.6; 455/457; 455/445
(58) Field of Classification Search ............. 455/456.6, 455/457, 445; 370/328, 238, 338
See application file for complete search history.

(56) References Cited

U.S. PATENT DOCUMENTS

| | | | | |
|---|---|---|---|---|
| 2002/0103935 | A1* | 8/2002 | Fishman et al. | 709/246 |
| 2002/0118663 | A1 | 8/2002 | Dorenbosch et al. | 370/338 |
| 2002/0163895 | A1 | 11/2002 | Haller et al. | 370/335 |
| 2005/0059416 | A1* | 3/2005 | Ono | 455/457 |
| 2005/0201348 | A1* | 9/2005 | Chitrapu et al. | 370/338 |
| 2006/0067299 | A1* | 3/2006 | Caspi et al. | 370/352 |
| 2006/0068794 | A1* | 3/2006 | Caspi et al. | 455/445 |
| 2006/0098576 | A1* | 5/2006 | Brownrigg et al. | 370/238 |

* cited by examiner

*Primary Examiner*—Sanh D Phu
(74) *Attorney, Agent, or Firm*—Amin, Turocy & Calvin, LLP

(57) ABSTRACT

A mobile access point is disclosed. The mobile access point includes a terminal module configured to provide one or more terminal functions for use by a user, the one or more terminal functions including a voice or data communications application, and a gateway module configured to provide one or more gateway functions for use by at least one client device, the one or more gateway functions including providing the at least one client device access to a computer network, and a processor configured to execute the terminal module and the gateway module to effectuate their corresponding functions.

12 Claims, 4 Drawing Sheets

# METHOD AND SYSTEM FOR PROVIDING MOBILE WIRELESS ACCESS POINTS

CLAIM OF PRIORITY UNDER 35 U.S.C. §119

The present Application for Patent claims priority to Provisional Application No. 60/658,268 entitled "METHOD AND SYSTEM FOR PROVIDING MOBILE WIRELESS ACCESS POINTS" filed Mar. 2, 2005, and assigned to the assignee hereof and hereby expressly incorporated by reference herein.

BACKGROUND

1. Field

The present disclosure relates generally to wireless communications, and more specifically, to methods and systems for providing mobile wireless access points.

2. Background

Due to the conveniences provided by wireless mobile services, such services are increasingly gaining popularity. Along with such increase in popularity, user appetite for higher level of quality of service has also become more demanding. Wireless services can be provided using a variety of wireless technologies. For example, one such wireless technology is the Wi-Fi ("wireless fidelity") standard developed by the IEEE ("Institute for Electrical and Electronics Engineers") for wireless local area network ("WLAN") and wireless devices. More specifically, Wi-Fi refers to certain types of WLAN that use specifications in the 802.11 family. The 802.11 family is an evolving set of wireless network standards or specifications including 802.11a, 802.11b and 802.11g etc. The 802.11 family specifies an over-the-air interface between a wireless client and a base station or between two wireless clients.

Wi-Fi has gained acceptance amongst many types of users including businesses, agencies, schools, and homes as an alternative to a wired local area network. Many airports, hotels, and fast-food facilities offer public access to Wi-Fi networks. These locations are generally known as access points or hot spots. Many charge a daily or hourly rate for access, but some are free.

Since Wi-Fi networks are fundamentally local area networks and hot spots are physically fixated in their positions, their coverage is especially sensitive to the distance between the hot spot and the wireless client. The quality of coverage generally varies with the number of hot spots within the proximity of a wireless client. Each hot spot can serve multiple wireless clients within a defined network area. However, as wireless clients move beyond the range of one hot spot, they are automatically handed over to the next hot spot. Consequently, in order to provide better coverage for wireless clients, operators of Wi-Fi networks are prompted to install additional hot spots at multitudinous locations. Such additional hot spot installations require substantial installation and operational costs, resulting in costs of perhaps hundreds of millions of dollars.

Hence, it would be desirable to have methods and systems that are capable of providing mobile wireless access points.

SUMMARY

The techniques disclosed herein address the above stated needs by providing a mobile wireless access point. In one aspect, a mobile access point may comprise a terminal module configured to provide one or more terminal functions for use by a user, the one or more terminal functions including a voice or data communications application, and a gateway module configured to provide one or more gateway functions for use by at least one client device, the one or more gateway functions including providing the at least one client device access to a computer network, and a processor configured to execute the terminal module and the gateway module to effectuate their corresponding functions.

In another aspect, a mobile phone may comprise means for facilitating communications between the mobile phone and a plurality of clients and an intermediary network, wherein communications with the plurality of clients are conducted using a first wireless communications protocol and communications with the intermediary network are conducted using a second wireless communications protocol, means for providing telephonic and data functions for use by a user via the intermediary network, means for reformatting data between the first wireless communications protocol and the second communications protocol, thereby allowing data to be exchanged between the plurality of clients and the intermediary network, and means for making a destination computer network accessible to the plurality of clients via the intermediary network.

In a further aspect, a processor for use in a mobile access point is disclosed. The processor may be configured to control one or more terminal functions including voice or data communications application; and one or more gateway functions to allow at least one client device to access a destination computer network.

In still another aspect, a method for providing a mobile access point includes implementing a terminal function on a mobile device, the terminal function including a voice or data communications application, and implementing a gateway function on the mobile device to allow a destination computer network to be accessed by at least one client device via the mobile device.

In still a further aspect, a processor-readable medium having a plurality of instructions is disclosed. The plurality of instructions includes a set of instructions for performing one or more terminal functions including a voice or data communications application, and a set of instructions for effecting one or more gateway functions to allow at least one client device to access a destination computer network via the mobile device.

In yet another aspect, a method for providing a mobile access point may include configuring a mobile device to conduct communications between the mobile device and a plurality of clients based on a first wireless communications protocol, configuring the mobile device to conduct communications between the mobile device and an intermediary network based on a second wireless communications protocol, configuring the mobile device to provide telephonic and data functions on the mobile device for use by a user via the intermediary network, configuring the mobile device to reformat data between the first wireless communications protocol and the second communications protocol, thereby allowing data to be exchanged between the plurality of clients and the intermediary network, and configuring the mobile device to make a destination computer network accessible to the plurality of clients via the intermediary network.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects.

Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
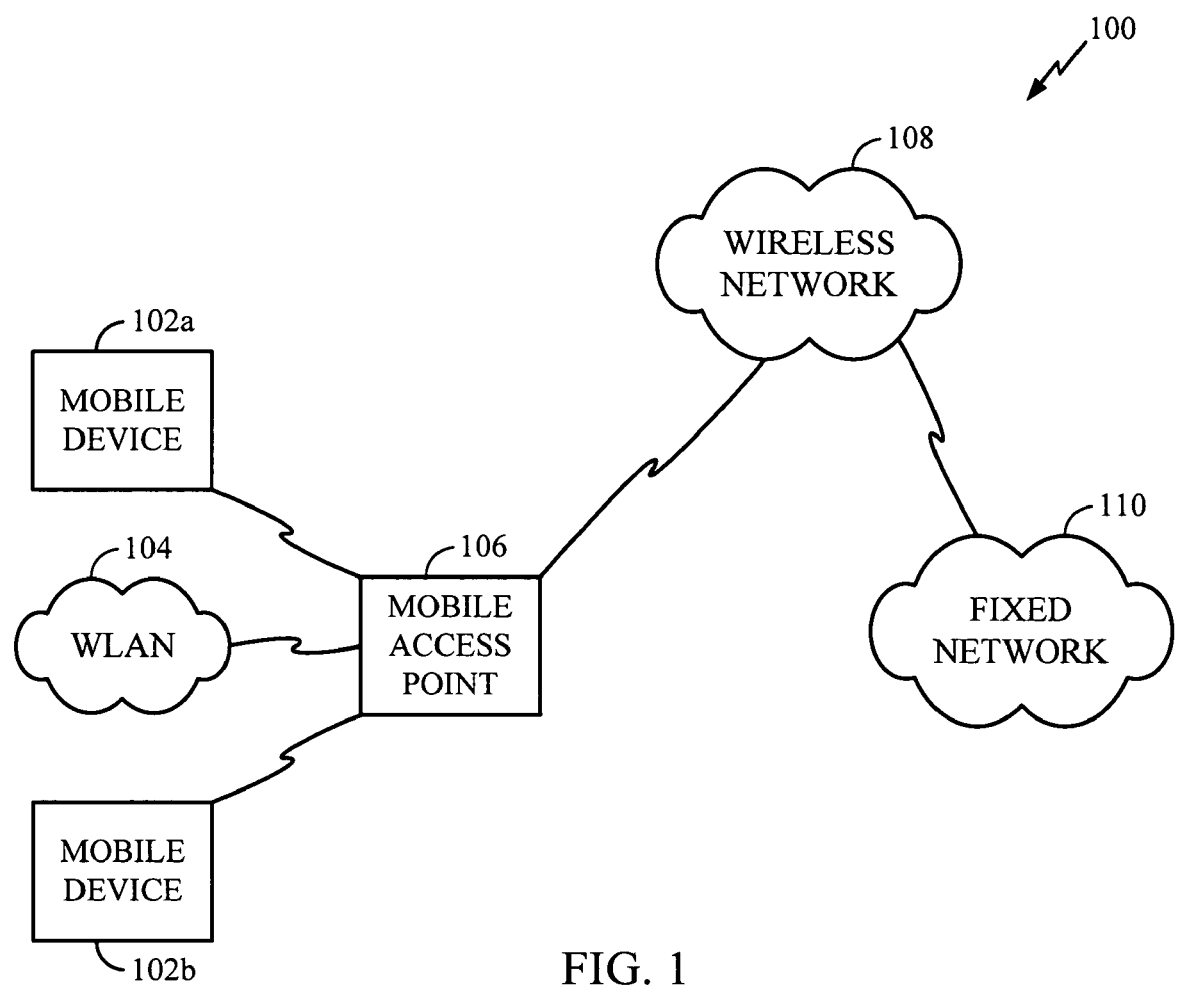
FIG. 1 is a simplified schematic diagram illustrating one embodiment of a mobile wireless access point system according to the present disclosure.

FIG. 1 illustrates one system configuration that can be used to provide a mobile wireless access point. The system 100 may include a number of mobile devices 102a,b, a wireless local area network 104 ("WLAN"), a mobile access point 106, a wireless network 108 and a fixed network 110.

The mobile devices 102a,b may further include mobile phones, personal digital assistants ("PDAs") and other types of mobile communications devices. The mobile access point 106 may provide dual or multi-functionality including, for example, terminal and gateway functionality. The terminal functionality may include functions that are similar to those offered by the mobile devices 102a,b; and the gateway functionality may include the capability to allow the mobile devices 102a,b and/or the WLAN 104 to communicate with the fixed network 110. The mobile devices 102a,b and the WLAN 104 may communicate with the mobile access point 106 using one of a variety of short-range wireless communications protocols, such as, the 802.11 family.

The mobile access point 106, in turn, may communicate with the wireless network 108 using a number of wired and wireless communications protocols, such as, CDMA ("Code Division Multiple Access"). The wireless network 108 may include a cellular telecommunications network.

The fixed network 110 may further include the Internet and other types of computer networks.

As mentioned above, the mobile access point 106 may provide terminal and gateway functionality. For example, with respect to terminal functionality, the mobile access point 106 may be used by a user as a mobile phone to conduct voice and/or data communications or applications via the wireless network 108. With respect to gateway functionality, the mobile access point 106 may be used by one or more of the mobile devices 102a,b and/or the WLAN 104 as an access point to access or otherwise communicate with the fixed network 110. The fixed network 110 may include various different types of networks including, for example, the Internet.

Since the mobile access point 106 may communicate with the mobile devices 102a,b, the WLAN 104 and the wireless network 108 using different wireless communications protocols (e.g., the 802.11 family and CDMA), communications with the mobile access point 106 may be wireless at both ends. As a result, the mobile access point 106 need not be fixated. In other words, the mobile access point 106 may be moved around without any physical constraints. By making the mobile access point 106 ambulatory, the mobile access point 106 may then be brought closer to the mobile devices 102a,b and/or the WLAN 104. As a result, easier and more convenient access to the fixed network 110 can be achieved. It should also be noted that the mobile access point 106 may be moved near a stationary device (not shown). Consequently, the stationary device may have access to the fixed network 110.

Figure 2:
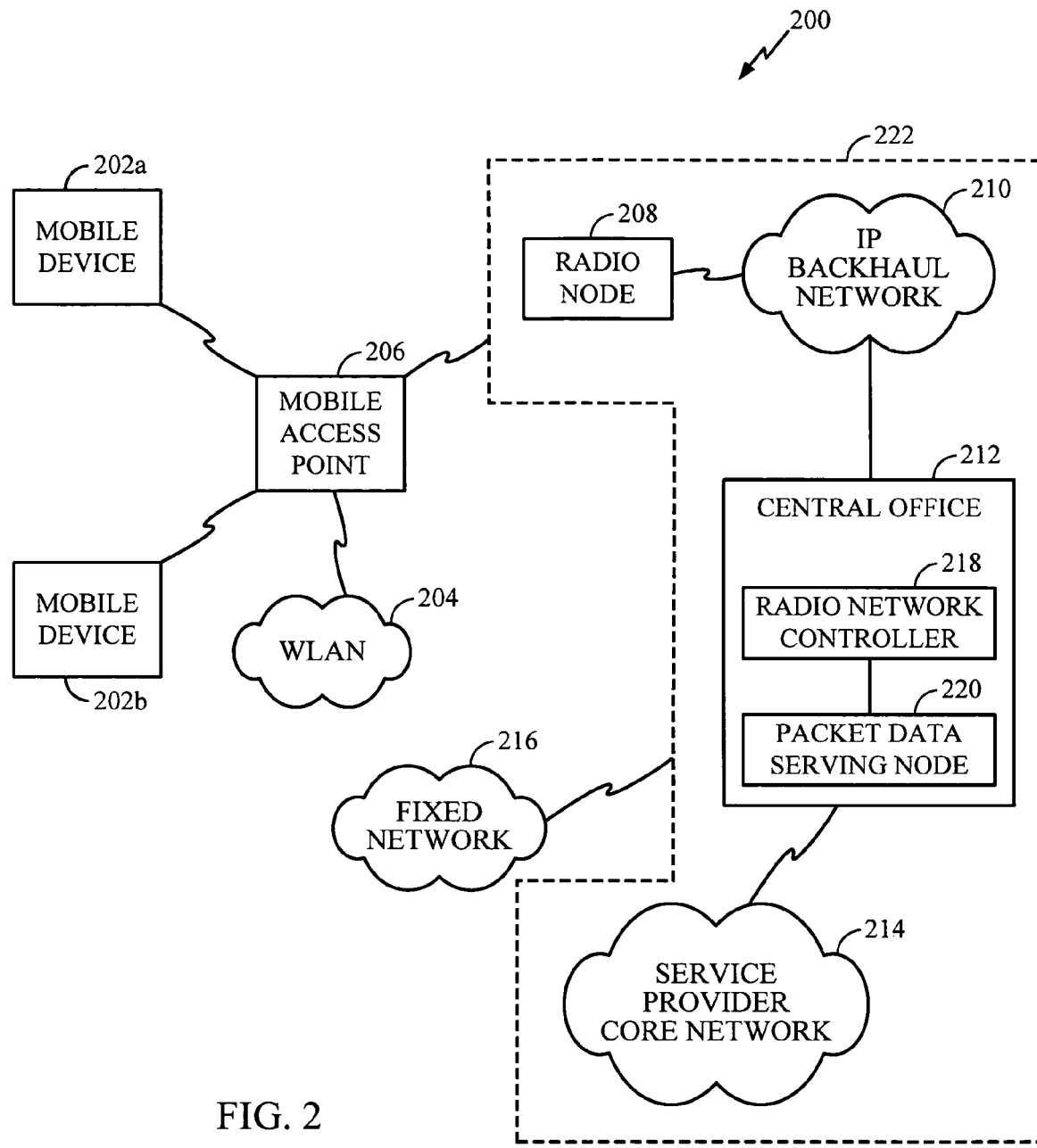
FIG. 2 is a simplified schematic diagram illustrating another embodiment of a mobile wireless access point system according to the present disclosure.

FIG. 2 illustrates another system configuration that can be used to provide the mobile wireless access point. The system 200 may be used in conjunction with another wireless technology commonly known as EV-DO (Evolution-Data Optimized) that has recently been developed to provide faster mobile data services. The EV-DO technology is considered a 3G technology based on CDMA2000-1x (a Code Division Multiple Access standard). An EV-DO network generally delivers average download data rates between 600K and 1,200K bit/sec during off-peak hours, and between 150K and 300K bit/sec during peak hours. Instantaneous data rates are as high as 2.4M bit/sec. These data rates are achieved using only 1.25 MHz of spectrum. While EV-DO is described herein, a person of ordinary skill in the art will appreciate that other types of wireless technologies may be used.

The system 200 may include a number of mobile devices 202a,b, a WLAN 204, a mobile access point 206, a radio node 208, an IP ("Internet Protocol") backhaul network 210, a central office 212, a service provider core network 214 and a fixed network 216. The mobile devices 202a,b, the WLAN 204, and the fixed network 216 are similar to those described in FIG. 1.

Similarly, the mobile access point 206 may provide terminal and gateway functionality. In this configuration, the mobile access point 206 is similar to that described in FIG. 1 with respect to terminal functionality and is further designed to handle EV-DO functionality. The EV-DO functionality relates to mobile data services and may be provided via an EV-DO network 222 which may include the radio node 208, the IP backhaul network 210, the central office 212 and the service provider core network 214. The central office 212 may further include a radio network controller 218 and a packet data serving node 220.

The radio node 208 may be installed at a cell or transmission site and can support a number of subscribers or users. The radio network controller 218 may be located in the central office 212 and provide hand-off assistance, mobility management and terminal-level security. Each radio network controller 218 can support one or more radio nodes 208 and connect to the service provider core network 214 through the packet data serving node 220. The packet data serving node 220 may be a standard wireless router.

An EV-DO network is different from other 3G networks in that it is completely decoupled from the legacy circuit-switched wireless voice network. This has let some vendors build their EV-DO networks based entirely on IP technologies. Using IP transport between the radio node 208 and radio network controller 218 lowers backhaul costs by giving operators a choice of backhaul services, including frame relay, router networks, metropolitan Ethernet and wireless backhaul. IP-based EV-DO networks may take advantage of off-the-shelf IP equipment such as routers and servers, and use open standards for network management. Furthermore, in an IP-based EV-DO network, the radio node 208 may perform radio frequency processing, baseband modulation/demodulation and packet scheduling.

The mobile access point 206 may also provide gateway functionality. The mobile access point 106 may be used by one or more of the mobile devices 202*a,b* and/or the WLAN 204 as a hot spot or access point to access or otherwise communicate with the fixed network 216, such as, the Internet. In the configuration shown in FIG. 2, access to the fixed network 216 may be effected via the EV-DO network 222. For example, the mobile device 202*a* may communicate with the mobile access point 206 using the 802.11 wireless communications protocol. In turn, the mobile access point 206 may convert or reformat the data received from the mobile device 202*a* into the EV-DO protocol and transmit the reformatted data to the central office 212 via the radio node 208 and the IP backhaul network 210. The central office 212 may then perform additional data reformatting, if needed, and transmit the data to the fixed network 216 for further delivery to desired destination(s) (not shown) coupled to the fixed network 216. Similarly, data sent by the fixed network 216 may be forwarded by the central office 212 to the mobile access point 206 via the IP backhaul network 210 and the radio node 208. The mobile access point 206, in turn, may reformat the data received from the central office 212 and then forward the data to the mobile devices 202*a,b* and/or the WLAN 204.

Figure 3:
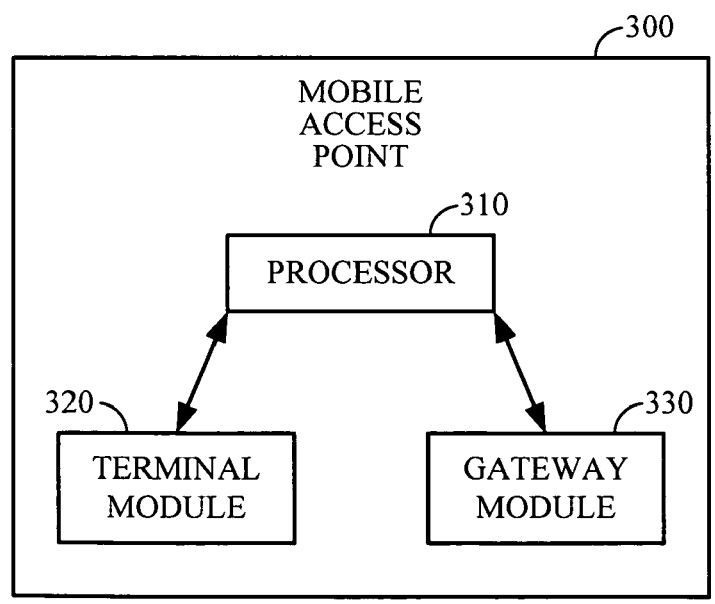
FIG. 3 is a simplified schematic diagram illustrating a mobile phone that can be used as a mobile wireless access point according to the present disclosure.

FIG. 3 shows an example mobile access point 300 comprising a processor 310, a terminal module 320 and a gateway module 330. The terminal module 320 provides one or more terminal functions for use by a user. The terminal functions may include, but is not limited to, voice or data communications applications. The communications applications may allow users to conduct a telephonic transaction. The gateway module 330 provides one or more gateway functions for use by at least one client device. The gateway functions may include, but is not limited to, providing to a client device access to a computer network. The processor 310 controls the terminal and gateway modules 320 and 330. The processor 310 executes the terminal module 310 and the gateway module 320 to effectuate their corresponding functions.

Figure 4:
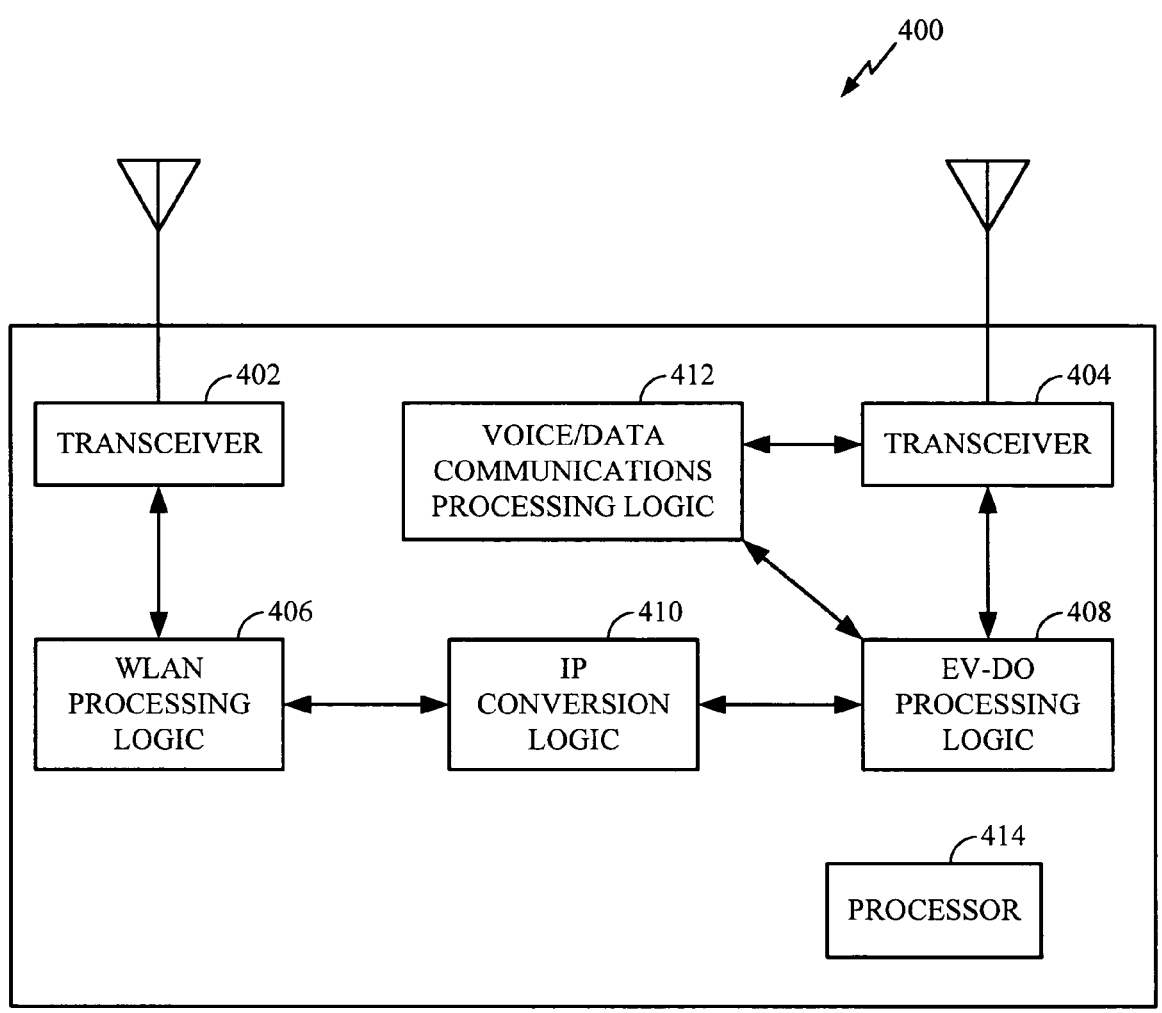
FIG. 4 is a simplified schematic diagram illustrating one embodiment of a mobile wireless access point according to the present disclosure.

FIG. 4 shows an example mobile phone 400 that may be used as the mobile access point 300 as shown in FIG. 3. The mobile phone 400 may provide both terminal and gateway functionality using a number of components including two transceivers 402, 404, WLAN processing logic 406, EV-DO processing logic 408, IP conversion logic 410, voice/data communications processing logic 412, and a processor 414 having control logic. It should be noted that the mobile access point may comprise additional elements in accordance to the needs of the various implementations.

The processor 414 is used to coordinate and control operations of various components of the mobile phone 400. Processor 414 may be configured to provide a terminal function such as the voice or data communications application, and a gateway function to provide access to a computer network.

To provide the terminal functionality, the mobile phone 400 may utilize the transceiver 404 and the voice/data communications processing logic 412, both collectively configured to allow a user to use the mobile phone 400 to conduct voice or data communications, such as, making a phone call.

To provide the gateway functionality, the mobile phone 400 may collectively utilize the transceiver 402, the WLAN processing logic 406, the IP conversion logic 410 and the EV-DO processing logic 408. The transceiver 402 may be used to transmit and receive data communicated between the mobile devices 202*a,b,* the WLAN 204 and the mobile access point 206. The WLAN processing logic 406 may be configured to process data that is received from or to be forwarded to the mobile devices 202*a,b* and/or the WLAN 204. Some of the processing functions performed by the WLAN processing logic 406 may include modulation, demodulation, encoding and decoding based on the wireless communications protocol used between the mobile access point 206 and the mobile devices 202*a,b* and the WLAN 204. The IP conversion logic 410 may be configured to convert or reformat data exchanged between the EV-DO network 222 and the mobile devices 202*a,b* and the WLAN 204. For example, the IP conversion logic 410 may convert data between the 802.11 and the EV-DO protocols. The EV-DO processing logic 408 may be configured to process data that is received from or to be forwarded to the EV-DO network 222. Similar to the WLAN processing logic 406, some of the processing functions performed by the EV-DO processing logic 408 may include modulation, demodulation, encoding and decoding based on the EV-DO protocol.

EV-DO processing logic 408 may also cooperate independently with the voice/data communications processing logic 412 to effect EV-DO data services.

The mobile phone 400 may be used as the mobile access point 206 as shown in FIG. 2 as follows. In this example, it is assumed that the mobile devices 202*a,b* and the WLAN 204 communicate with the mobile access point 206 using the 802.11b protocol and that the EV-DO network 222 is used to access the fixed network 216. Data sent by the mobile device 202*a* is received by the mobile access point 206 via the transceiver 302. The received data is then processed by the WLAN processing logic 406 in accordance with the 802.11b protocol. The processed data is further forwarded to the IP conversion logic 410. The IP conversion logic 410 reformats the data from the 802.11b protocol to the EV-DO protocol. The reformatted data is then provided to the EV-DO processing logic 408 which renders the data ready for transmission to the EV-DO network 222 via the transceiver 404. Upon receiving the data, the central office 212 performs the appropriate processing and forwards the processed data to the fixed network 216. For data sent by the fixed network 216 to the mobile device 202*a,* the mobile access point 206 receives the data via the transceiver 404. The received data is then processed by the EV-DO processing logic 408 in accordance with the EV-DO protocol. Next, the processed data is forwarded to the IP conversion logic 410 for reformatting from the EV-DO protocol to the 802.11 b protocol. The reformatted data is then provided to the WLAN processing logic 406 which renders the data ready for transmission to the mobile device 202*a* via the transceiver 402.

Figure 5:
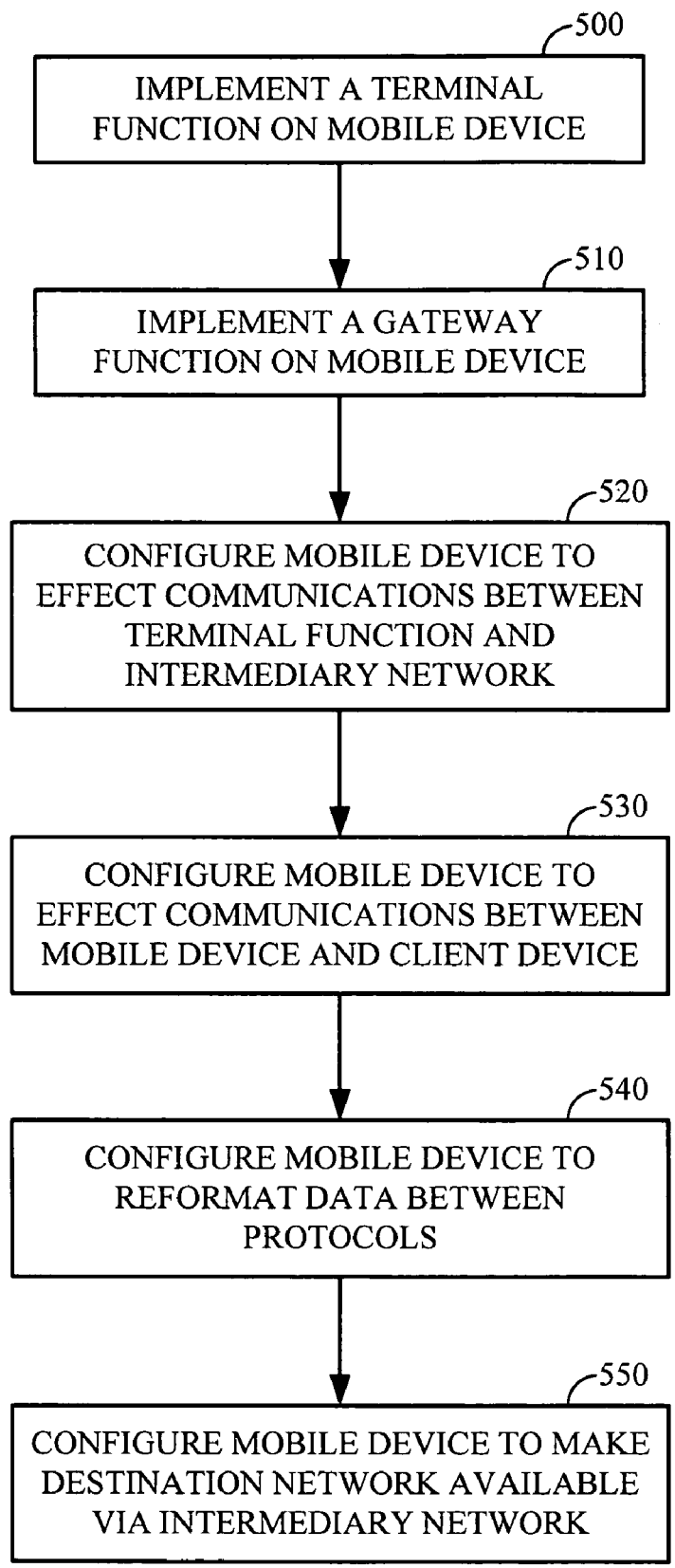
FIG. 5 is a logic flow diagram illustrating a method usable to provide a mobile wireless access point according to the present disclosure.

FIG. 5 illustrates the logic flow of a method usable to provide the mobile access point 206. The mobile access point 206 may be the mobile device 400 as shown in FIG. 4. At block 500, a terminal function is implemented on the mobile device 400. The terminal function includes a voice and/or data communications application. At block 510, a gateway function is also implemented on the mobile device 400 to allow a destination computer network to be accessed by at least one client device via the mobile device 400. The terminal function may further include a wireless communications application. At block 520, the mobile device 400 is configured to effect communications between the wireless communications application and an intermediary network based on a first wireless communications protocol. At block 530, the mobile device 400 is configured to effect communications between the at least one client device and the mobile device 400 based on a second wireless communications protocol. At block 540, the mobile device 400 is configured to reformat data between the first and second wireless communications protocols, thereby allowing the at least one client device to communicate with the intermediary network. At block 550, the mobile device is configured to make the destination computer network accessible via the intermediary network.

It should be apparent to those skilled in the art that the elements of mobile access point 300 and/or mobile phone 400 may be rearranged without affecting the operation of the mobile access point. Similarly, one or more of the elements of the mobile access point 300 and/or mobile access point 400 may be combined, integrated, and/or implemented together without affection the functions of the elements. Furthermore, it should be noted that a mobile phone has been used for the purposes of explanation. The system as described above according to the present disclosure can be deployed in various applications. For example, in addition to mobile phones, the system can be deployed in various other mobile devices, such as but not limited to, PDAs, laptops and vehicles. The system may also be implemented in non-mobile devices. Based on the disclosure and teachings provided herein, a person of ordinary skill in the art will appreciate how to deploy the system in other applications.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A mobile access point comprising:
   a terminal module configured to provide one or more terminal functions for use by a user, the one or more terminal functions including a voice or data communications application;
   a gateway module configured to provide one or more gateway functions for use by at least one client device, the one or more gateway functions including providing the at least one client device access to a computer network;
   the gateway module further configured to effect communications between the plurality of clients and the mobile access point using a first wireless communications protocol, and to provide client device access by providing access point service usable by a plurality of clients to access a destination computer network, the gateway module further configured to effect communications with the computer network using a second wireless communications protocol; and
   a processor configured to execute the terminal module and the gateway module to effectuate their corresponding functions, wherein the first wireless communications protocol includes the 802.11 family and the second wireless communications protocol includes a packet data serving node communications protocol capable of providing data communications separate from voice communication.

2. The mobile access point of claim 1 wherein the voice or data communications application is configured to allow the user to conduct a telephonic transaction.

3. The mobile access point of claim 1 wherein the one or more terminal functions further include a wireless communications application, the wireless communications application using a first wireless communications protocol; and
   wherein the mobile access point is configured to communicate with the at least one client device using a second wireless communications protocol.

4. The mobile access point of claim 3 wherein the processor is further configured to reformat data between the first wireless communications protocol and the second wireless communications protocol.

5. The mobile access point of claim 1 wherein the computer network includes the Internet.

6. The mobile access point of claim 1 wherein the at least one client device comprises a mobile device.

7. A mobile phone comprising:
   means for facilitating communications between the mobile phone and a plurality of clients and an intermediary network, including means to communicate through a wireless communications protocol in the 802.11 family, wherein communications with the plurality of clients are conducted using a first wireless communications protocol and communications with the intermediary network are conducted using a second wireless communications protocol;

means for providing telephonic and data functions for use by a user via the intermediary network, including a packet data serving node communications protocol capable of providing data communications separate from voice communication;

means for reformatting data between the first wireless communications protocol and the second communications protocol, thereby allowing data to be exchanged between the plurality of clients and the intermediary network; and means for making a destination computer network accessible to the plurality of clients via the intermediary network.

8. The mobile phone of claim 7 wherein the first wireless communications protocol includes the 802.11 family; and
   wherein the second wireless communications protocol includes the EV-DO (Evolution-Data Optimized) protocol.

9. The mobile phone of claim 7 wherein the intermediary network includes a cellular telecommunications network; and
   wherein the destination computer network includes the Internet.

10. A method for providing a mobile access point, the method comprising:
    implementing a terminal function on a mobile device, the terminal function including a voice or data communications application, the terminal function further includes a wireless communications application;
    implementing a gateway function on the mobile device to allow a destination computer network to be accessed by at least one client device via the mobile device;
    configuring the mobile device to effect communications between the wireless communications application and an intermediary network based on a first wireless communications protocol, the first wireless communications protocol comprising a packet switching communications protocol capable of providing data communications separate from voice communication;
    configuring the mobile device to effect communications between the at least one client device and the mobile device based on a second wireless communications protocol, the second wireless communications protocol comprising a wireless communications protocol in the 802.11 family;
    configuring the mobile device to reformat data between the first and second wireless communications protocols, thereby allowing the at least one client device to communicate with the intermediary network; and
    configuring the mobile device to make the destination computer network accessible via the intermediary network.

11. A method for providing a mobile access point, the method comprising:
    configuring a mobile device to conduct communications between the mobile device and a plurality of clients based on a first wireless communications protocol, the first wireless communications protocol comprising a packet switching communications protocol capable of providing data communications separate from voice communication;
    configuring the mobile device to conduct communications between the mobile device and an intermediary network based on a second wireless communications protocol, the second wireless communications protocol comprising a wireless communications protocol in the 802.11 family;
    configuring the mobile device to provide telephonic and data functions on the mobile device for use by a user via the intermediary network;
    configuring the mobile device to reformat data between the first wireless communications protocol and the second communications protocol, thereby allowing data to be exchanged between the plurality of clients and the intermediary network; and
    configuring the mobile device to make a destination computer network accessible to the plurality of clients via the intermediary network.

12. The method of claim 11 wherein the first wireless communications protocol includes the 802.11 family; and
    wherein the second wireless communications protocol includes the EV-DO (Evolution-Data Optimized) protocol.

* * * * *